United States Patent [19]
Goto

[11] Patent Number: 6,023,369
[45] Date of Patent: Feb. 8, 2000

[54] REFLECTION SCREEN AND FRONT PROJECTION SYSTEM

[75] Inventor: Masahiro Goto, Shinjuku-Ku, Japan

[73] Assignee: Dai Nippon Printing Co., Ltd., Japan

[21] Appl. No.: 08/905,543

[22] Filed: Aug. 4, 1997

[30] Foreign Application Priority Data

Aug. 16, 1996 [JP] Japan .................................. 8-216243

[51] Int. Cl.$^7$ .................................................. G03B 21/56
[52] U.S. Cl. ............................................ 359/443; 359/449
[58] Field of Search ................................. 359/443, 449, 359/451, 459, 448, 743, 742

[56] References Cited

U.S. PATENT DOCUMENTS

| | | | |
|---|---|---|---|
| 1,262,511 | 4/1918 | Kelly | 359/443 |
| 3,292,491 | 12/1966 | Hourdiaux | 88/24 |
| 3,293,982 | 12/1966 | Appeldorn | 88/24 |
| 3,469,837 | 9/1969 | Heilig | 272/8 |
| 3,792,914 | 2/1974 | Elias | 350/123 |
| 3,893,748 | 7/1975 | De Palma et al. | 350/128 |
| 4,452,527 | 6/1984 | Turner et al. | 355/45 |
| 5,153,778 | 10/1992 | Sasian-Alvarado | 359/742 |
| 5,337,179 | 8/1994 | Hodges | 359/443 |
| 5,418,584 | 5/1995 | Larson | 353/122 |
| 5,541,769 | 7/1996 | Ansley et al. | 359/451 |
| 5,742,438 | 4/1998 | Conner et al. | 359/743 |
| 5,781,344 | 7/1998 | Vance | 359/614 |
| 5,803,568 | 9/1998 | Eckhardt | 353/102 |

*Primary Examiner*—Safet Metjahic
*Assistant Examiner*—Christopher E. Mahoney
*Attorney, Agent, or Firm*—Parkhurst & Wendel, L.L.P.

[57] ABSTRACT

A reflection screen includes a light transmittable base portion and a reflecting portion. The reflecting portion is arranged on two rear side of the base portion and has a reflecting surface. Either the base portion or the reflecting portion has the shape of a Fresnel lens, which has an optical center located toward a light source from a geometrical center of the screen.

19 Claims, 11 Drawing Sheets

REFLECTION SCREEN AND FRONT PROJECTION SYSTEM

BACKGROUND OF THE INVENTION

1. Field of the Invention

The present invention relates generally to a reflection screen and a front projection system using the reflection screen. More specifically, the invention relates to a reflection screen which allows a projected image light from the front of the reflection screen to be reflected on a reflecting surface thereof to observe the reflected image light, and a front projection system using the reflection screen.

2. Description of the Related Art

Japanese Patent Laid-Open No. 8-29875 discloses an example of a conventional reflection screen of this type wherein a light transmittable diffusion layer is formed on the surface of a transparent sheet, and the surface of a linear Fresnel lens for light reflection is formed on the reverse thereof.

However, in this conventional reflection screen, there is a problem in that the reflection of external light is easily caused and particularly the contrast on the screen is adversely affected by the external light from the upper side. In addition, since the reflection is isotropic, the diffusion can not be suitably controlled in horizontal and vertical directions.

SUMMARY OF THE INVENTION

It is therefore an object of the present invention to eliminate the aforementioned problems and to provide a reflection screen, which prevents the contrast from being lowered by an external light to obtain a desired angle of visibility, and a front projection system using the reflection screen.

In order to accomplish the aforementioned and other objects, according to one aspect of the present invention, there is provided a reflection screen for reflecting a projected image light from a light source arranged on a side, which comprises: a light transmittable base portion having an observed-side surface on the side of an observer; and the reflecting portion arranged on a rear side of the base portion and having a reflecting surface, wherein at least one of the base portion and the reflecting portion has the shape of a Fresnel lens which has an optical center shifted toward the light source from a geometrical center of the screen.

The optical center of the shape of Fresnel lens may be arranged outside of the screen.

The reflecting portion may have the shape of a Fresnel lens, which is the shape of a circular Fresnel lens.

The observed-side surface of the base portion may have the shape of a lenticular lens for diffusing light.

The reflecting portion may have the first shape of a linear Fresnel lens which has a longitudinal direction, and the base portion may have the second shape of a linear Fresnel lens which has a longitudinal direction perpendicular to the longitudinal direction of the first shape of linear Fresnel lens.

The second shape of linear Fresnel lens may have an optical center which is shifted toward the light source from the geometrical center of the screen.

The reflecting surface of the reflecting portion may have the shape of a lenticular lens for diffusing light.

In addition, the shape of a mat may be formed on any one of the observed-side surface of the base portion, the reflecting surface of the reflecting portion, and an interface between the base portion and the reflecting portion.

Moreover, any one of the base portion and the reflecting portion may be colored.

According another aspect of the present invention, there is provided a front projection system which comprises: a reflection screen; and a light source arranged on one side of the reflection screen and irradiating projected image light on the reflection screen, the reflection screen comprising a light transmittable base portion having an observed-side surface on the side of an observer, and a reflecting portion arranged on the rear side of the base portion and having a reflecting surface, wherein at least one of the base portion and the reflecting portion has the shape of a Fresnel lens which has an optical center shifted toward said light source from a geometrical center of the screen.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS (First Embodiment)

Referring now to the accompanying drawings, preferred embodiments of the present invention will be described below.

Figure 1:
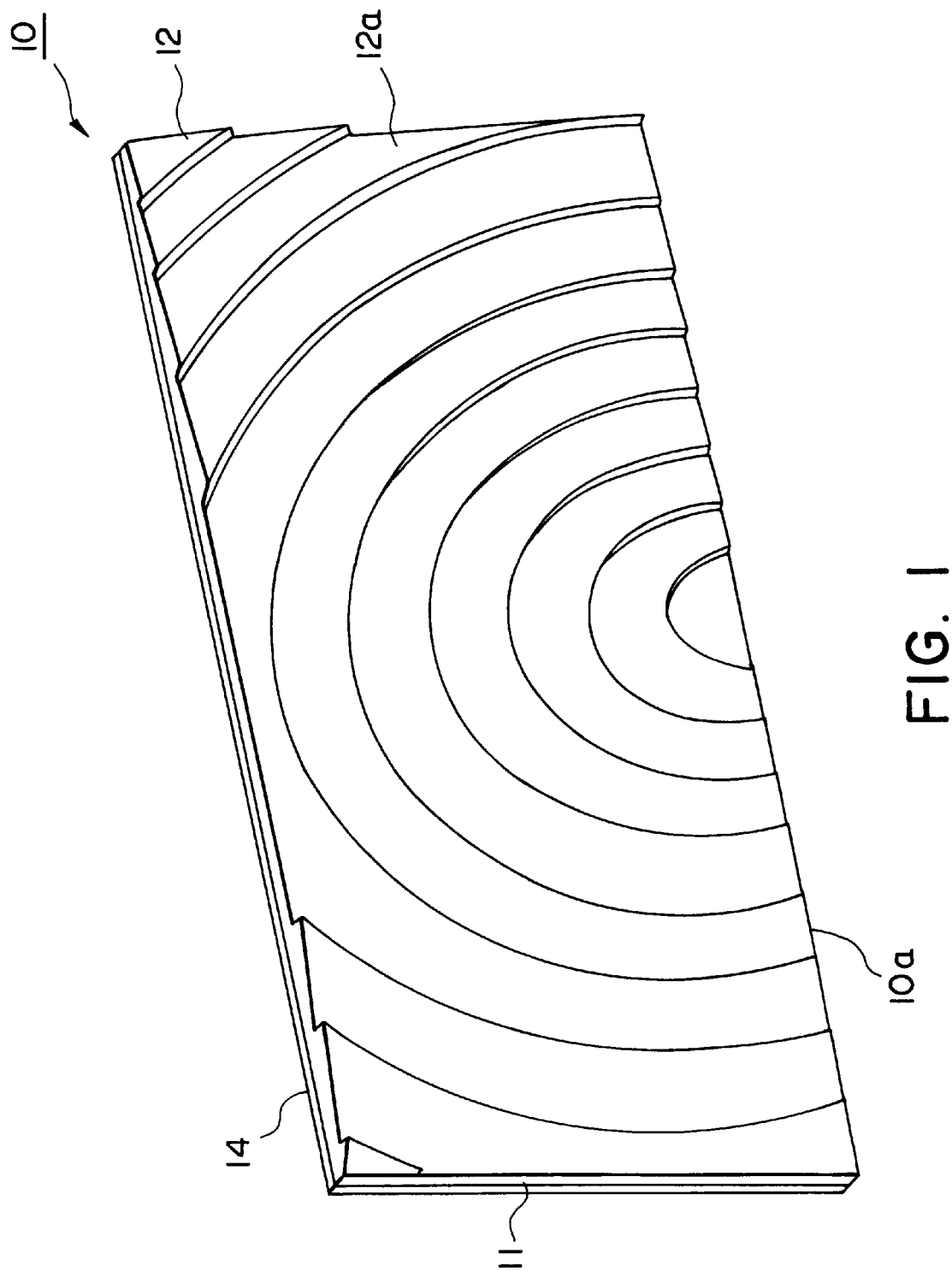
FIG. 1 is a perspective view of a first preferred embodiment of a reflection screen according to the present invention.
Figure 2:
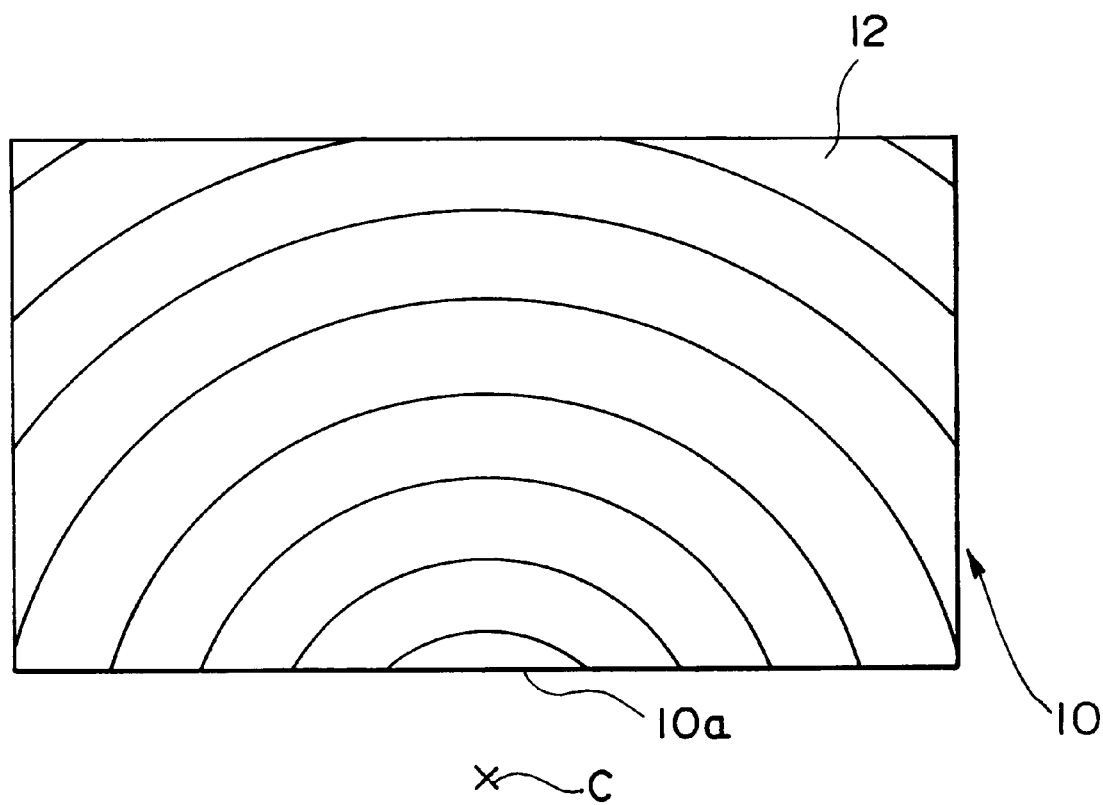
FIG. 2 is a plan view illustrating a shape of circular Fresnel lens of the first preferred embodiment of a reflection screen according to the present invention.

First, referring to FIGS. 1 through 3, a first preferred embodiment of the present invention will be described. FIG. 1 shows the first preferred embodiment of a reflection screen according to the present invention, and FIG. 2 shows a shape of circular Fresnel lens of the reflection screen of FIG. 1.

In this preferred embodiment, a reflection screen 10 comprises a base portion 11 and a reflecting portion 12.

The base portion 11 is a light transmittable sheet or film of a resin, such as acrylic, polycarbonate and polyethylene terephthalate resins. The base portion 11 is colored or tinted with a gray dye or pigment or the like so that the transmittance thereof is 80%.

The reflecting portion 12 is formed on the rear side of the base portion 11, and has a reflecting surface 12a in the shape of a circular Fresnel lens. As shown in FIG. 2, the shape of circular Fresnel lens of the reflecting surface 12a is designed so that an optical center C thereof is arranged outside of (or below) a lower end 10a of the screen.

The center C of the shape of circular Fresnel lens means a portion at which the angle of the surface of a unit of lens composing the shape of circular Fresnel lens (corresponding to the reflecting surface 12a) is zero, i.e., an optical center. The expression "the optical center is arranged outside of the lower end of the screen" means that the shape of circular Fresnel lens is formed so that an imaginary optical center of the shape of Fresnel lens, which is not actually formed, is arranged outside of the lower end of the screen, i.e., below the lower end of the screen".

The reflecting portion 12 is obtained by forming the shape of circular Fresnel lens on the rear side of the base portion 11 using an ultraviolet curable resin or the like and by forming a reflective film on the surface of the lens.

The reflection screen 10 has the shape of a mat 14, formed on the surface (the observed-side surface) of the base portion 11, for diffusing a projected image light in horizontal and vertical directions.

Figure 3:
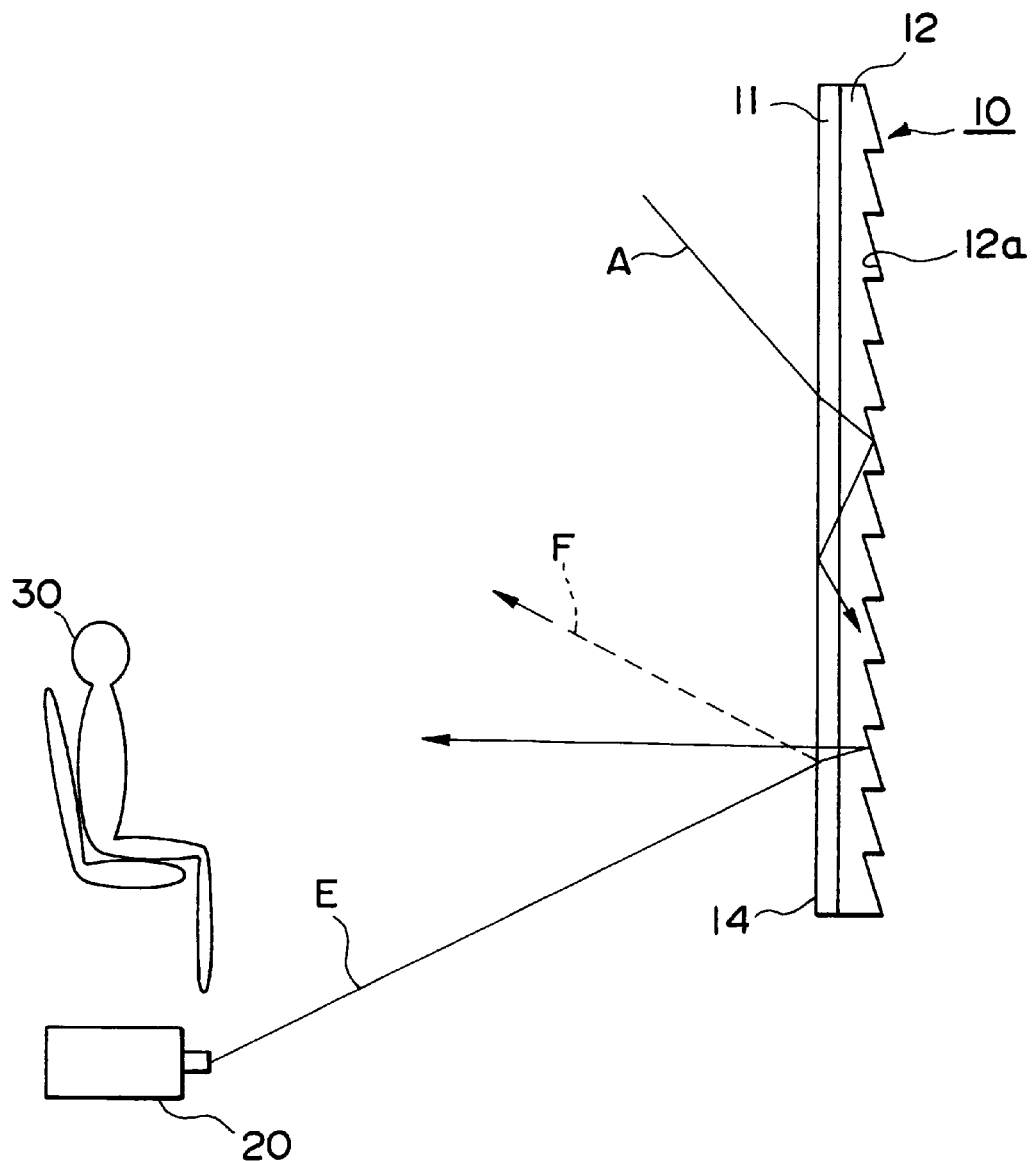
FIG. 3 is a schematic view explaining optical paths of external light, projected image light and directly reflected light of a light source in the first preferred embodiment of the reflection screen according to the present invention.

As shown in FIG. 3, in this preferred embodiment, projected image light E from a light source 20 is incident on the reflection screen 10 from a lower side, and is reflected toward the observer 30. On the other hand, external light A is incident on the reflection screen 10 from an upper side, and is reflected by the reflecting surface 12a, having the shape of circular Fresnel lens toward a lower side. Then, the external light A is totally reflected by the observed-side surface 14 of the base portion 11. Thus, while the external light A is repeatedly reflected between the reflecting surface 12a and the observed-side surface 14 of the base portion 11, it is absorbed by the colored base portion 11 to be attenuated therein. In addition, it is possible to prevent the light (glare) F, which is directly reflected by the observed-side surface, of the projected image light E from being produced by the shape of mat 14 formed on the observed-side surface. (The light F directly reflected by the observed-side surface will be hereinafter referred to as a "directly reflected light F")

(Second Embodiment)

Figure 4A:
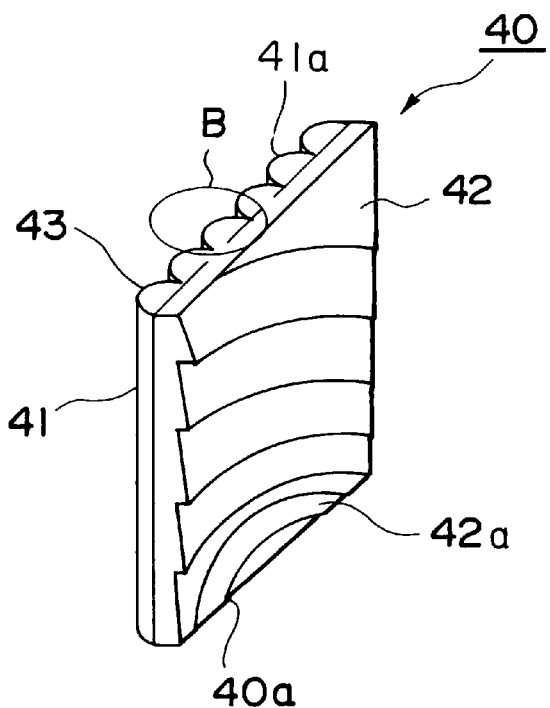
FIG. 4A is a perspective view of a second preferred embodiment of a reflection screen according to the present invention.
Figure 4B:
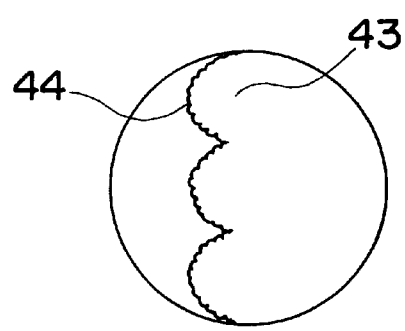
FIG. 4B is an enlarged view showing the shape of a lenticular lens of the reflection screen of FIG. 4A.
Figure 5:
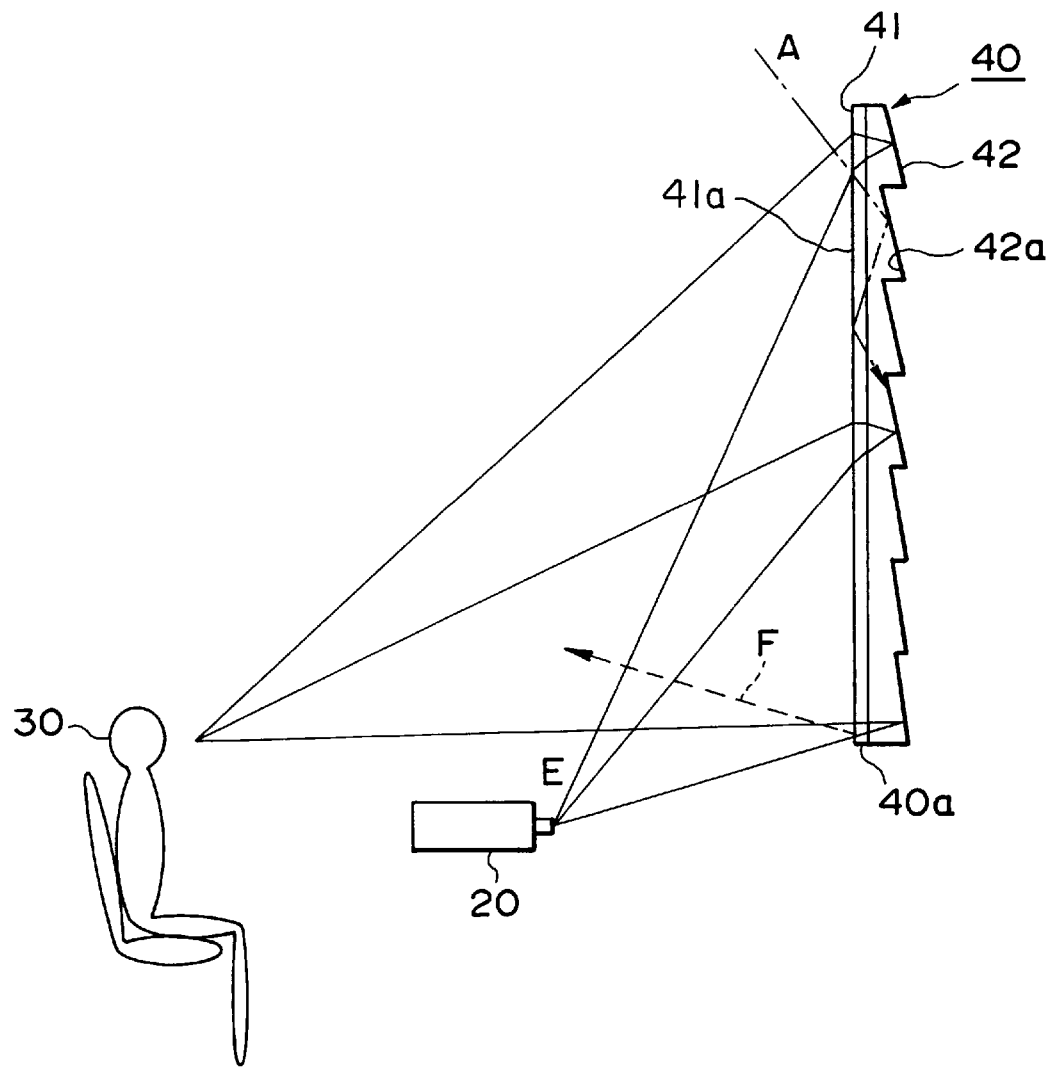
FIG. 5 is a schematic view of a preferred embodiment of a front projection system according to the present invention.

Referring to FIGS. 4A, 4B and 5, a second preferred embodiment of a reflection screen according to the present invention will be described below.

In this preferred embodiment, a reflection screen 40 comprises a base portion 41, which is the same as that in the first preferred embodiment, and a reflecting portion 42. An observed-side surface 41a of the base portion 41 has the shape of a lenticular lens 43 for horizontal diffusion, which has an optical-axis correcting effect for controlling an optical axis in horizontal directions and a directive diffusion effect. In addition, as shown in FIG. 4B, the shape of lenticular lens 43 has the shape of a mat 44 for controlling the optical axis mainly in vertical directions.

FIG. 5 shows a preferred embodiment of a front projection system according to the present invention. This front projection system comprises the reflection screen 40 shown in FIGS. 4A and 4B, and a light source 20. As can be seen from FIG. 5, the optical axis of projected image light E from the light source 20 is inclined, so that even the projected image light E projected on the lower end 40a of the reflection screen 40 goes upwardly.

In this preferred embodiment, the projected image light E from the light source 20 is incident on the reflection screen 40 from a lower side of the reflection screen 40, and is reflected toward an observer 30. On the other hand, external light A is incident on the reflection screen 40 from an upper side of the reflection screen 40, and is reflected downwardly from the reflecting surface 42a of the reflecting portion 42 having the shape of circular Fresnel lens. Then, a part of the external light A is transmitted toward the lower side instead of toward the observer 30. The remaining external light A is totally reflected by the observed-side surface 41a of the base portion 41, and is repeatedly reflected between the reflecting surface 42a and the observed-side surface 41a of the base portion 41 to be absorbed by the colored base portion 41 to be attenuated therein. Therefore, since the external light A does not enter the eye of the observer 30, it is possible to suppress the reflection of the external light A, so that the front projection system can be used in a well-lit room.

Figure 6:
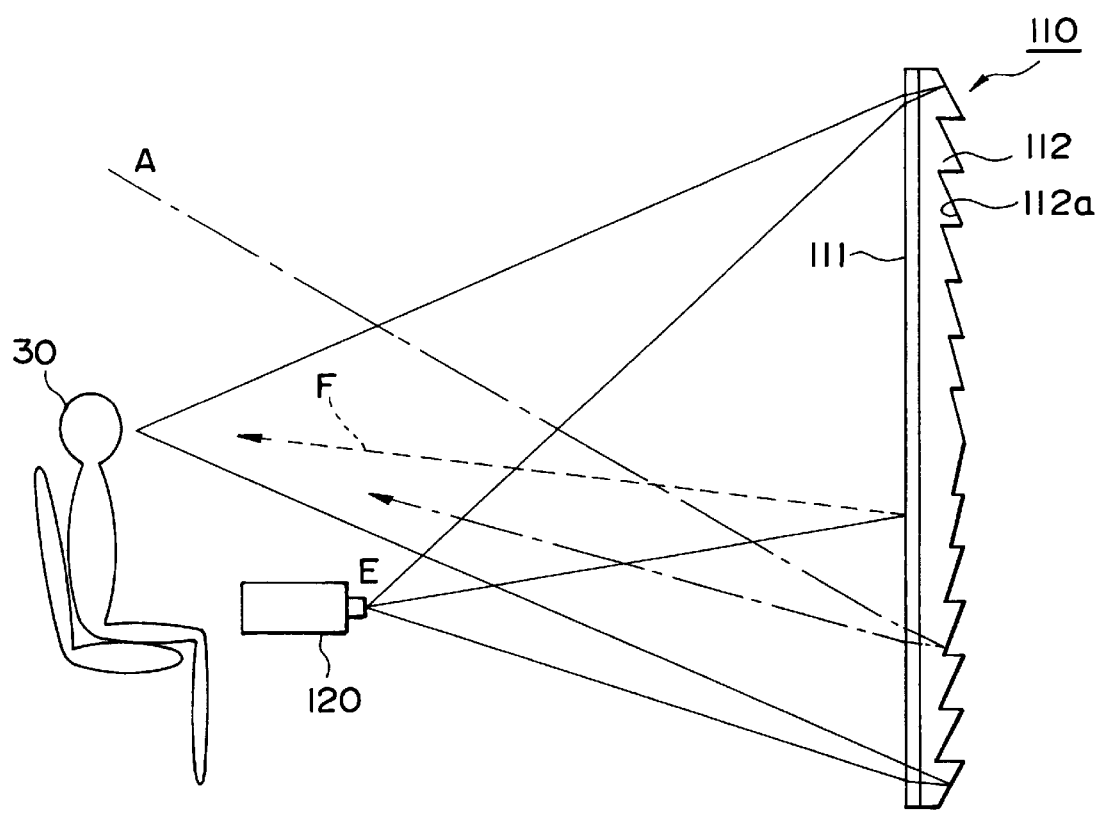
FIG. 6 is a schematic view of a conventional front projection system.

On the other hand, FIG. 6 shows an example of a conventional front projection system. This conventional front projection system comprises a reflection screen 110 and a light source 120. The reflection screen 110 has a reflecting portion 112, which is formed with a reflecting surface 112a having the shape of a circular Fresnel lens, the optical center of which is arranged so as to substantially correspond to the geometrical center thereof. The light source 120 is arranged so as to have a downwardly inclined angle of projection at the lower end of the screen.

In such a conventional front projection system, the external light A being incident from an upper side is reflected by the lower portion of the reflecting surface 112a having the shape of circular Fresnel lens of the reflection screen 110 so as to go out upwardly toward the observer 30, so that an image of a lower contrast is formed. At a result, the conventional system is different from that of the present invention.

Moreover, according to the second preferred embodiment, after the projected image light is reflected from the reflecting surface 42a, it is diffused in a horizontal direction by the horizontally diffusing lenticular lens 43 and in a vertical direction by the shape of mat 44, so that it is possible to control the diffused angle in two directions, i.e., horizontal and vertical directions. Therefore, it is possible to effectively utilize the projected image light, and it is possible to enhance the gain.

In addition, since the shape of mat 44 is formed on the observed side, it is possible to prevent the directly reflected light F of the light source from being incident on the observer's eye. In addition, even if the reflecting surface 42a of the reflecting portion 42 has defects caused by a forming die, it is possible to prevent the defects from being conspicuous.

Moreover, since the reflecting portion 42 does not have the optical center of the shape of circular Fresnel lens which is most difficult to be cut, it is possible to easily manufacture a forming die.

(Third Embodiment)

Figure 7:
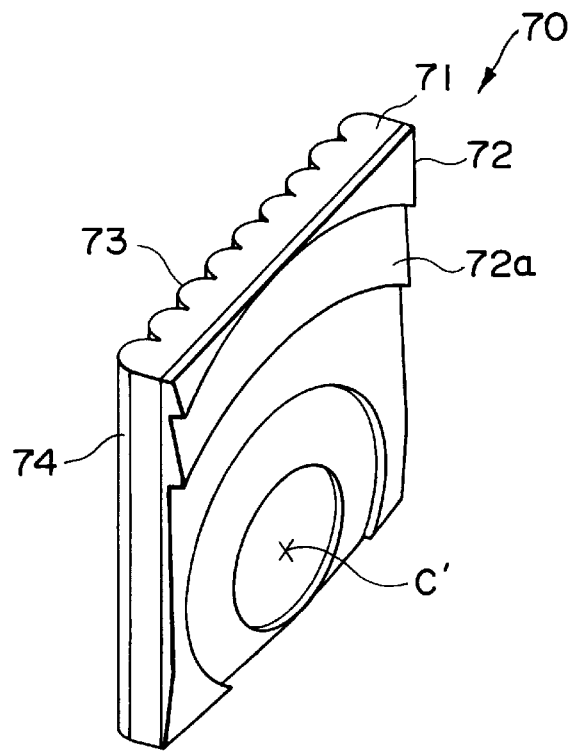
FIG. 7 is a perspective view of a third preferred embodiment of a reflection screen according to the present invention.
Figure 8:
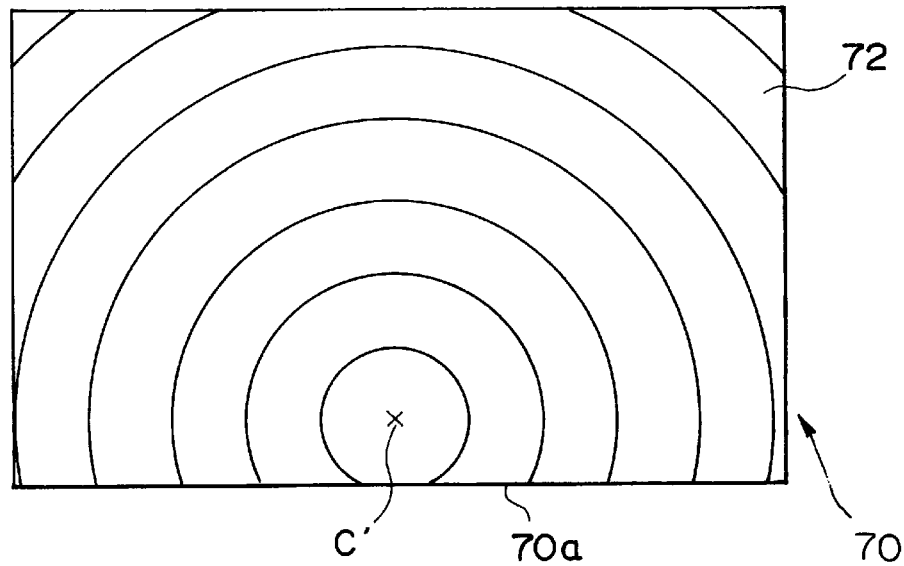
FIG. 8 is a plan view illustrating a shape of circular Fresnel lens of a third preferred embodiment of a reflection screen according to the present invention.

Referring to FIGS. 7 and 8, a third preferred embodiment of a reflection screen according to the present invention will be described below.

FIG. 7 shows the third preferred embodiment of a reflection screen according to the present invention, and FIG. 8 shows the shape of circular Fresnel lens of the reflection screen of FIG. 7.

In the third preferred embodiment, a reflection screen 70 generally comprises a base portion 71 and a reflecting portion 72. The reflection screen 70 in this preferred embodiment is the same as the reflection screen 40 in the second preferred embodiment, except that, on the reflecting surface 72a of the shape of circular Fresnel lens formed on the reflecting portion 72, the optical center C' of the shape of circular Fresnel lens is offset downwardly from the geometrical center of the screen although it is arranged above the lower end 70a of the screen. Although the offset amount of the center C' downwardly offset from the geometrical center of the screen varies in accordance with the design of the screen, it may be so designed that the reflected light of the external light is transmitted toward the lower side than the observer's eye.

Although the aforementioned second preferred embodiment is most desired to improve the contrast since the reflecting surface 42a of the shape of circular Fresnel lens is formed by only the upper shape of circular Fresnel lens, the third preferred embodiment can sufficiently improve the contrast of the image light.

(Fourth Embodiment)

Referring to FIGS. 9A, 9B, 10A, 10B and 11, a fourth preferred embodiment of a reflection screen according to the present invention will be described below.

In this preferred embodiment, a reflection screen 90 comprises a base portion 91 and a reflecting portion 92. The base portion 91 is a light transmittable sheet or film of a resin, and colored or tinted so that the transmittance thereof is 80%.

The reflecting portion 92 is formed on a rear side of the base portion 91, and has a reflecting surface 92a having the shape of a linear Fresnel lens so that the longitudinal directions thereof extend in horizontal directions. The shape of linear Fresnel lens of the reflecting surface 92a is so designed that an optical center C of the linear Fresnel lens is arranged outside of (or below) a lower end 90a of the screen. Furthermore, the center C of the shape of circular Fresnel lens means an optical center (in vertical directions) at which the angle of a unit of lens is zero, when a longitudinal direction of the lens forming the circular Fresnel lens accords with a horizontal direction.

Figure 9A:
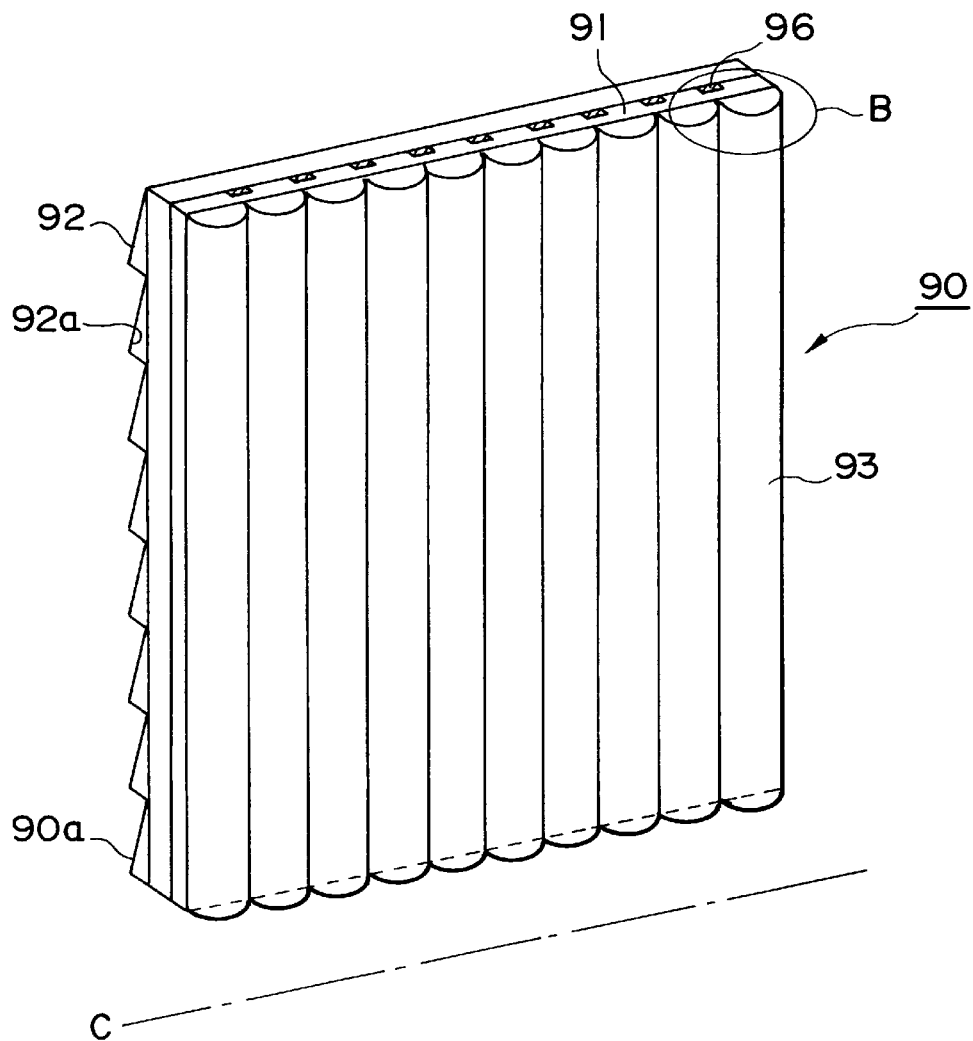
FIG. 9A is a perspective view of a fourth preferred embodiment of a reflection screen according to the present invention.
Figure 9B:
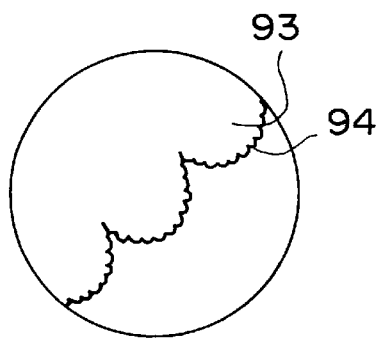
FIG. 9B is an enlarged view showing the shape of a lenticular lens of the reflection screen of FIG. 9A.

The reflection screen 90 has the shape of a lenticular lens 93, formed on the observed-side surface of the base portion 91, for controlling a horizontal optical axis and for diffusing projected image light in a horizontal direction. Light trapping layers (light absorbing layers) 96 are provided in the base portion 91 at locations other than those where the projected image light passing through the shape of lenticular lens 93 is condensed. Alternatively, the light trapping layers 96 may be provided in the interface between the base portion 91 and the reflecting portion 92, or in the reflecting portion 92, or on the observed-side surface of the reflecting surface 92a. As shown in FIG. 9B, a shape of mat 94 is formed on the surface of the shape of lenticular lens 93.

Figure 10A:
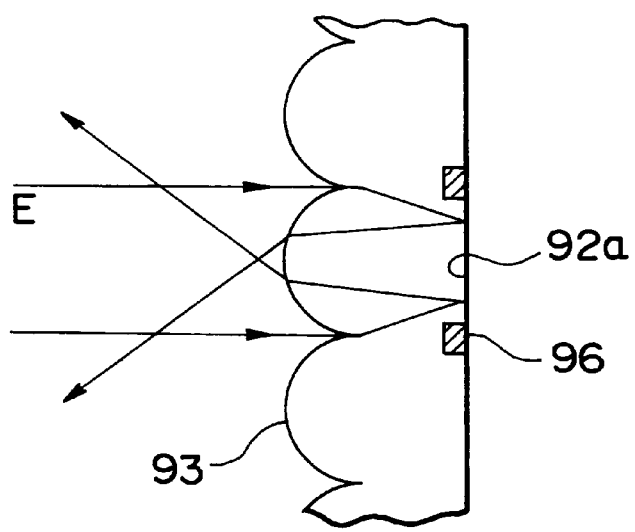
FIGS. 10A and 10B are schematic views explaining the correction effect of an optical axis in the shape of the lenticular lens of FIG. 9B.
Figure 10B:
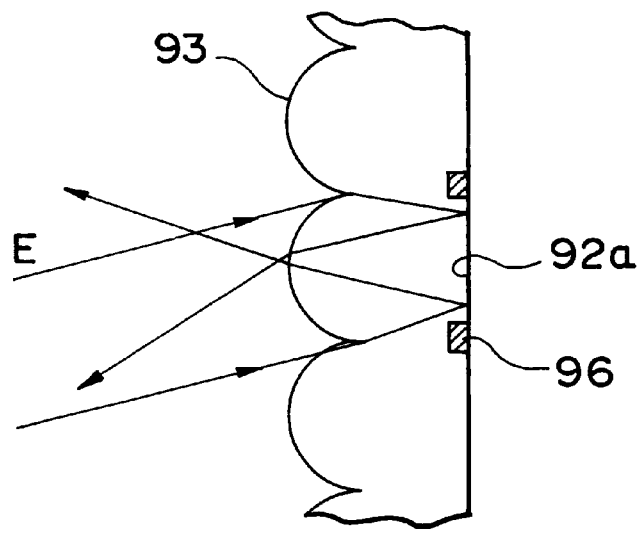

Referring to FIGS. 10A and 10B, an optical-axis correcting effect of the shape of lenticular lens 93 of the reflection screen in the forth preferred embodiment will be described below.

FIG. 10A is a top view showing a central portion of the screen with respect to the horizontal direction. As shown in FIG. 10A, the projected image light E is incident in a direction substantially perpendicular to the surface of the screen to be condensed therein. Then, the projected image light E is reflected by the reflecting surface 92a, and diffuses when it goes out from the shape of lenticular lens 93.

FIG. 10B is another top view showing a left end portion of the screen. As shown in FIG. 10B, the optical axis of the projected image light, which is incident on the shape of lenticular lens 93 and reflected therefrom, is corrected so that the outgoing direction corresponds to the central portion shown in FIG. 10A by the function of the shape of lenticular lens 93.

In the forth preferred embodiment, since the reflecting surface 92a of the reflecting screen 90 has the shape of a linear Fresnel lens, there is an advantage is that the shape of the linear Fresnel lens can be continuously formed using a roll type forming die. In addition, the shape of lenticular lens 93 formed on the observed-side surface of the base portion 91 can be continuously formed using a roll type forming die.

That is, the reflecting portion 92 may be produced by the steps of: applying an ultraviolet curable resin or the like to a transparent resin film or sheet; forming the resulting film or sheet by a forming die having the reversed shape of linear Fresnel lens; irradiating the formed film or sheet with an ultraviolet light to cure the ultraviolet curable resin; and forming a reflective coat on the shape of linear Fresnel lens. In addition, a transparent sheet having the shape of lenticular lens 93 may be separately formed using a roll type forming die by the extrusion molding of a thermoplastic resin or by an ultraviolet curable resin or the like. This transparent sheet thus formed may be laminated on the reflecting portion 92.

Figure 11:
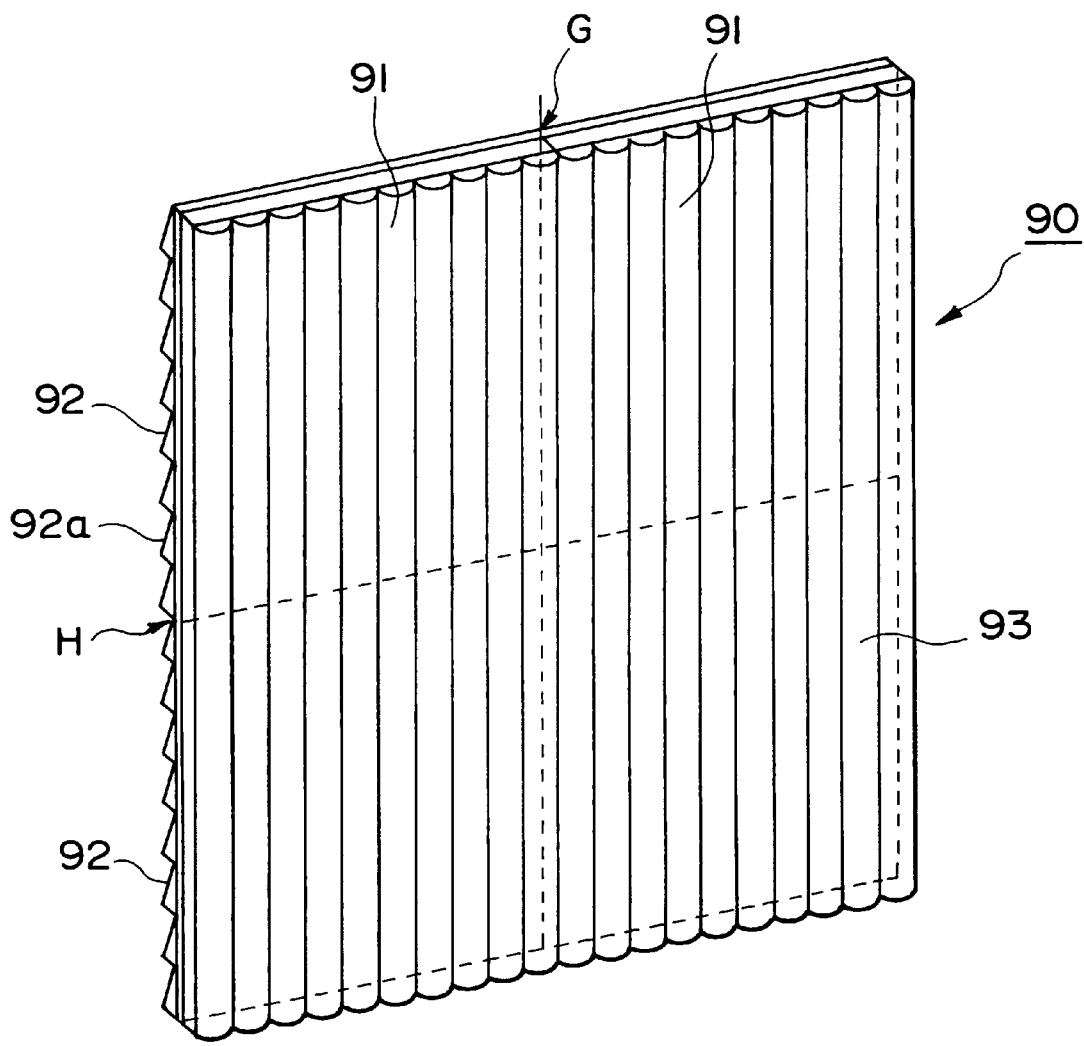
FIG. 11 is a perspective view of a larger reflection screen, which is an application of the reflection screen of FIG. 9A.

FIG. 11 shows a larger reflection screen serving as an application of the fourth preferred embodiment of the reflection screen according to the present invention.

As mentioned above, the shapes of lenticular lens and linear Fresnel lens can be continuously formed using a roll type forming die. In this case, the size of a unit of lens in a longitudinal direction is not restricted, so that a large size of lens sheet or lens film can be obtained. On the other hand, the width of a unit of lens in a direction perpendicular to the longitudinal directions is restricted by the width of the forming die.

However, as shown in FIG. 11, a plurality of base portions 91 having the shape of lenticular lens 93 may be arranged in the horizontal direction of the screen and connected to each other at the connected portions G, and a plurality of reflecting portions 92 with the reflecting surface 92a having the shape of linear Fresnel lens may be arranged on a rear side of the base portions 91 and connected to each other at the connected portions H. Then, the reflecting portions 92 may be laminated on the base portions 91, so that a large screen of 150 inches or more can be obtained.

(Fifth Embodiment)

Figure 12A:
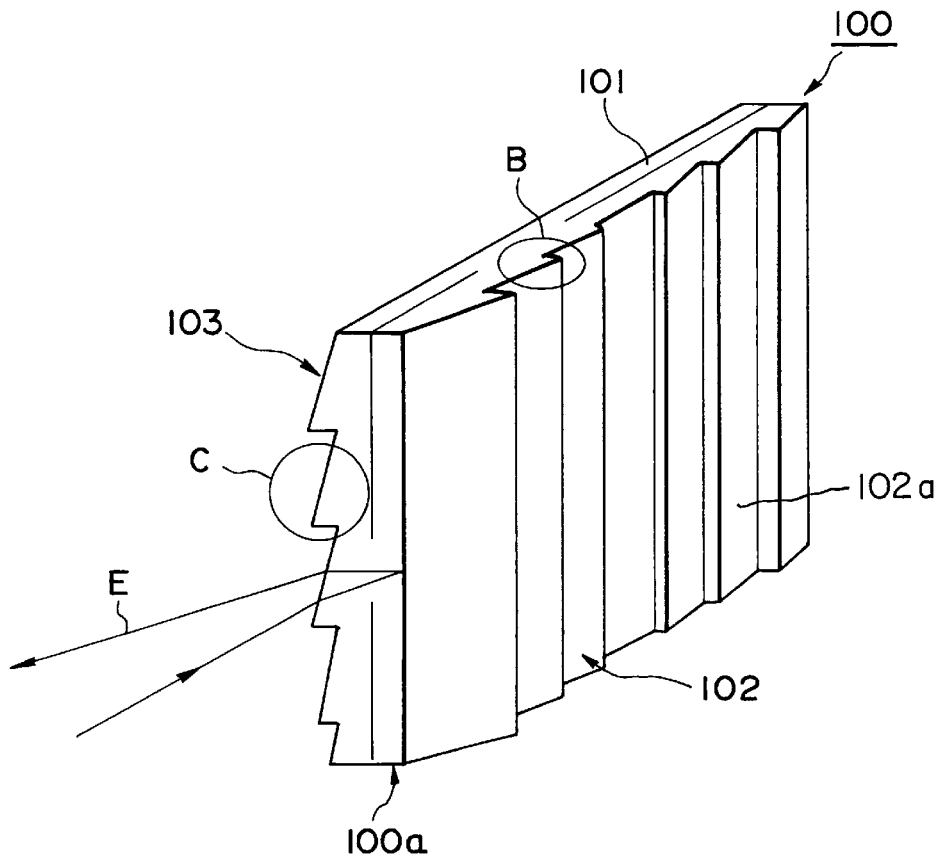
FIG. 12A is a perspective view of a fifth preferred embodiment of a reflection screen according to the present invention.
Figure 12B:
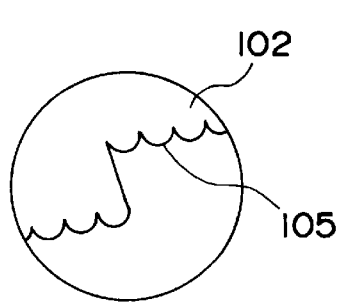
FIG. 12B is an enlarged view of a reflecting portion of the reflection screen of FIG. 12A.
Figure 12C:
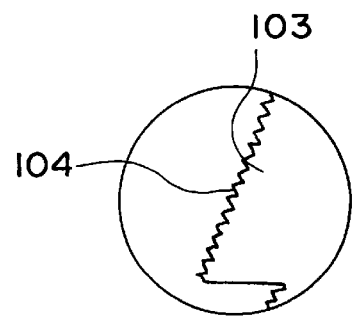
FIG. 12C is an enlarged view showing the shape of linear Fresnel lens of the reflection screen of FIG. 12A.

Referring to FIGS. 12A, 12B and 12C, the fifth preferred embodiment of a reflection screen according to the present invention will be described below.

As shown in FIG. 12A, in this preferred embodiment, a reflection screen 100 comprises a base portion 101 and a reflecting portion 102. The base portion 101 has a light transmissibility and is tinted so that the transmittance thereof is 80%.

The reflecting portion 102 is formed on the rear side of the base portion 101, and has a reflecting surface 102a having a first shape of linear Fresnel lens, a longitudinal direction of which is a vertical direction. As shown in FIG. 12B, the reflecting surface 102a of the reflecting portion 102 has the shape of a lenticular lens for diffusing light in a horizontal direction.

On the observed-side surface (light incoming surface) 103 of the base portion 101, a second linear Fresnel lens 103 for correcting a vertical optical axis, whose longitudinal direction is substantially perpendicular to the longitudinal direction of the first linear Fresnel lens 102 is formed. The lens angle of the second linear Fresnel lens 103 is set so as to correct the optical axis in a downward direction, and the optical center of the second linear Fresnel lens 103 is arranged outside of the lower end 100a of the screen. Furthermore, the center of the second linear Fresnel lens means an optical center (in vertical directions) wherein a lens angle of a unit of lens is zero when the longitudinal direction of forming the second linear Fresnel lens accord with a horizontal direction.

In addition, as shown in FIG. 12C, the second linear Fresnel lens 103 has the shape of a mat 104 on the surface thereof.

The reflection screen 100 of the fifth preferred embodiment may be used for the front projection system shown in FIG. 5.

In this preferred embodiment, the projected image light E from the light source 20 is incident on the reflection screen 100 from a lower side, and is transmitted toward the observer 30. On the other hand, the external light A is incident on the reflection screen 100 from an upper side, and is refracted downwardly by the shape of linear Fresnel lens 103 of the base portion 101. Therefore, since the external light A does not enter the eye of the observer 30, it is possible to suppress the reflection of the external light A, so that it is possible to use the front projection system in a well-lit room.

In addition, after the projected image light E is reflected from the reflecting surface 102a, it is diffused in a horizontal direction by the shape of lenticular lens 105 and in vertical directions by the mat portion 104, so that the diffused angle can be controlled in two directions, i.e., in the horizontal and vertical directions. Therefore, it is possible to effectively utilize the projected image light and to enhance the gain.

In addition, since the mat portion 104 is formed on the side of the observer 30, it is possible to prevent the directly reflected light F of the light source from being incident on the observer's eye. In addition, even if the reflecting surface 102a of the reflecting portion 102 has defects caused by a forming die, it is possible to prevent the defects from being conspicuous.

Moreover, since the base portion 101 does not have the optical center of the shape of linear Fresnel lens which is most difficult to be cut, it is possible to easily manufacture a forming die.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the reflection screen may be a roll-up type screen of a film. In addition, the mat portion may be provided on the reflecting surface of the reflecting portion, or on the interface between the base portion and the reflecting portion. Moreover, the reflecting portion may be colored.

As mentioned above, according to the present invention, the reflection screen has a shape of Fresnel lens for refracting an optical axis downwards, and the optical center thereof is shifted downwards from the geometrical center of the screen. Since the external light is incident on the reflection screen from an upper side, it is refracted downwards by the shape of Fresnel lens so as not to enter the observer's eye. Therefore, it is possible to suppress the reflection of the external light, so that it is possible to use the reflection screen in a well-lit room. In addition, since the reflection screen controls the diffused angle in two directions by the shapes of lenticular lens and mat, it is possible to effectively utilize the projected image light, and it is possible to enhance the gain.

What is claimed is:

1. A planar-shaped reflection screen for reflecting projected image light from a light source arranged outside the periphery of the reflection screen, the reflection screen comprising:
    a light transmittable base portion having an observed-side surface on the side of an observer; and
    a reflecting portion arranged on a rear side of the base portion and having a reflecting surface;
    wherein said reflecting portion comprises the shape of a Fresnel lens having an optical center located off the screen between said light source and a geometrical center of the screen.

2. The reflection screen according to claim 1, wherein:
    said reflecting portion comprises the shape of a generally circular Fresnel lens.

3. The reflection screen according to claim 2, wherein:
    said base portion comprises the shape of a lenticular lens for diffusing light on said observed-side surface.

4. The reflection screen according to claim 1, wherein:
    said reflecting portion comprises a first linear Fresnel lens comprising the reflecting surface and having a longitudinal direction, and said base portion comprises a second linear Fresnel lens comprising the observed-side surface and having a longitudinal direction perpendicular to the longitudinal direction of said first linear Fresnel lens.

5. The reflection screen according to claim 4, wherein:
    said second linear Fresnel lens has an optical center located between the light source and the geometrical center of the screen.

6. The reflection screen according to claim 1, wherein:
    said reflecting portion comprises the shape of a lenticular lens for diffusing light on said reflecting surface.

7. The reflection screen according to claim 1, wherein:
    a mat is formed on one of said observed-side surface of said base portion, said reflecting surface of said reflecting portion, and an interface between said base portion and said reflecting portion.

8. The reflection screen according to claim 1, wherein:
    one of said base portion and said reflecting portion comprises a coloration.

9. A front projection system, comprising:
    a planar-shaped reflection screen;
    a light source arranged outside the periphery of the reflection screen for irradiating projected image light on the reflection screen; and
    said reflection screen comprising a light transmittable base portion having an observed-side surface on the side of an observer, and a reflecting portion arranged on a rear side of the base portion and having a reflecting surface, wherein said reflecting portion comprises the shape of a Fresnel lens having an optical center located off the screen between said light source and a geometrical center of the screen.

10. A planar-shaped reflection screen for reflecting projected image light from a light source arranged outside the periphery of the reflection screen, the reflection screen comprising:

a light transmittable base portion having an observed-side surface on the side of an observer; and a reflecting portion arranged on a rear side of the base portion and having a reflecting surface;

wherein the reflecting portion comprises the shape of a Fresnel lens having an optical center located between said light source and a geometrical center of the screen.

11. The reflection screen according to claim 10, wherein: said optical center is located off the screen.

12. The reflection screen according to claim 10, wherein: said reflecting portion comprises the shape of a generally circular Fresnel lens.

13. The reflection screen according to claim 10 wherein: said base portion comprises the shape of a lenticular lens for diffusing light on said observed-side surface.

14. The reflection screen according to claim 10, wherein: said reflecting portion comprises a first linear Fresnel lens comprising the reflecting surface and having a longitudinal direction, and said base portion comprises a second linear Fresnel lens comprising the observed-side surface and having a longitudinal direction perpendicular to the longitudinal direction of said first linear Fresnel lens.

15. The reflection screen according to claim 14 wherein: said second linear Fresnel lens has an optical center located between the light source and the geometrical center of the screen.

16. The reflection screen according to claim 10, wherein: said reflecting portion comprises the shape of a lenticular lens for diffusing light on said reflecting surface.

17. The reflection screen according to claim 10, wherein: a mat is formed on one of said observed-side surface of said base portion, said reflecting surface of said reflecting portion, and an interface between said base portion and said reflecting portion.

18. The reflection screen according to claim 10, wherein: one of said base portion and said reflecting portion comprises a coloration.

19. A front projection system, comprising:

a planar-shaped reflection screen;

a light source arranged outside the periphery of the reflection screen for irradiating projected image light on the reflection screen; and said reflection screen comprising a light transmittable base portion having an observed-side surface on the side of an observer, and a reflecting portion arranged on a rear side of the base portion and having a reflecting surface, wherein said reflecting portion comprises the shape of a Fresnel lens having an optical center located between said light source and a geometrical center of the screen.

* * * * *